3,268,467
ADHESIVE COMPOSITION COMPRISING THE REACTION PRODUCT OF POLYISOCYANATE AND A FORMALDEHYDE CONDENSATE
Grover W. Rye and Walter D. Havens, Cuyahoga Falls, Ohio, assignors to The Goodyear Tire & Rubber Company, Akron, Ohio, a corporation of Ohio
No Drawing. Filed Nov. 3, 1961, Ser. No. 149,880
8 Claims. (Cl. 260—29.3)

This invention relates to a resin-blocked polyisocyanate and its use as an adhesive component in bonding a rubber reinforcing element to a rubber. More particularly, it relates to aldehyde resin-blocked polyisocyanates which are dispersible in water in the manufacture of an aqueous adhesive system for use in bonding a reinforcing element made of a cellulosic material such as rayon, a polyamide such as nylon, a polyester such as Dacron, or a metal such as steel, to rubber.

The useful life of a rubber article reinforced with a natural or synthetic cord, such as pneumatic tires, V-belts and the like, depends upon the bond secured between the cord and the rubber. The nature of the cord influences the success of the bond, and it has been found that it is extremely difficult to adhere a polyester cord to a rubber, particularly where the reinforcing cord is to be used in the manufacture of pneumatic tires which must withstand extreme conditions of stress at relatively high temperatures which are developed at high and sustained speeds encountered, for example, by turnpike travel.

It is known that polyisocyanates develop acceptable adhesion between, for example, a polyester cord and the rubber being bonded thereto. However, polyisocyanates are utilized in a solvent media because of the high reactivity of the polyisocyanate for water. In the commercial production of pneumatic tires, it is more economical to use an aqueous adhesive system in contrast to a solvent system. Therefore, up to the present time, polyisocyanates have found limited use as bonding agents in pneumatic tire production.

Polyisocyanates may be inactivated temporarily by blocking the isocyanate group (—NCO) with well-known blocking agents, such as phenols and the like, but these systems do not produce the desirable high bond strengths. In addition, toxic by-products are formed when the phenol-blocked polyisocyanate is heated to regenerate the polyisocyanate.

It has now been discovered that a polyisocyanate may be temporarily blocked with a resin having adhesive-forming properties by reacting a polyisocyanate, and for purposes of illustration, polymethylene polyphenyl isocyanate, having the general formula

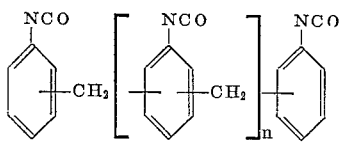

with an aldehyde type of resinous blocking agent which functions to protect the polyisocyanate against degradation in a water system and, when the resin-blocked isocyanate is exposed to elevated temperatures above 212° F., permits the polyisocyanate to be regenerated and thus become free to combine chemically with the polyester fiber, while the regenerated blocking agent itself becomes a component in the adhesive system to increase the bonding of the polyester fiber to the rubber.

Any polyisocyanate may be reacted with the aldehyde type of resin. Typical polyisocyanates that are to be used in the present invention in making the new blocked polyisocyanates are:

Polymethylene polyphenylisocyanate (PAPI)
Triphenyl methane-triisocyanate (TMTI)
2,4-tolylene-diisocyanate (2,4-TDI)
2,6-tolylene-diisocyanate (2,6-TDI)
Bitolylene diisocyanate (TODI)
Dianisidine diisocyanate (DADI)
Hexamethylene diisocyanate (HDI)
m-Phenylene diisocyanate (PDI)
1-alkyl-benzene-2,4-diisocyanate (AB-2,4-DI)
1-alkyl-benzene-2,5-diisocyanate (AB-2,5-DI)
2,6-dialkyl-benzene-1,4-diisocyanate (DBDI)
1-chlorobenzene-2,4-diisocyanate (CDI)
Dicyclohexylmethane-diisocyanate (CXDI)
3,3-dimethoxy diphenyl methane-4,4'-diisocyanate (DDMDI)
1-nitrobenzene-2,4-diisocyanate (NDI)
1-alkoxy-benzene-2,4-diisocyanate (ABDI)
1-alkylbenzene-2,6-diisocyanate (ADI)
m-Xylylene-diisocyanate
1,3-dimethyl-4,6-bis ($\beta$-isocyanatoethyl)-benzenediisocyanate
Hexahydrobenzidine-4,4'-diisocyanate
Ethylene-diisocyanate
Propylene-1,2-diisocyanate
Cyclohexylene-1,2-diisocyanate
3,3'-dichloro-4,4'-biphenylene diisocyanate
2,3-dimethyl-tetramethylene diisocyanate
p,p'-Diphenylene diisocyanate
2-chlorotrimethylene diisocyanate
Butane-1,2,2-triisocyanate
Trimethylene diisocyanate
Tetramethylene diisocyanate
Propylene-1,2-diisocyanate
Butylene-1,2-diisocyanate
Ethylidene diisocyanate Polymethylene polyphenylisocyanate identified above by the trademark "PAPI" is also referred to as polyaryl polyisocyanate and being a dark amber somewhat viscous liquid belonging to the aromatic polyisocyanate family as disclosed in a new product bulletin issued by The Carwin Company of North Haven, Connecticut, dated July 1956. "PAPI" is further described as containing both ortho and para substitution and composed of a family of low molecular weight polymers having an average composition of the trimer with $n$ in the formula above having an average value of 1 and manufactured under United States Patent 2,683,730.

Any resinous composition which has an active hydrogen and will temporarily block a polyisocyanate in a water system at least up to the boiling point of the water may be used. The preferred type of resinous blocking agent is made by reacting an aldehyde with a resin-forming component such as urea, or a phenol, preferably a polyhydric phenol, such as resorcinol and more preferably phenolic resins that are substantially soluble in water. However, phenolic resins which result in a reaction product with the polyisocyanate which can be emulsified or dispersed are also effective. Suitable aldehydes that may be used in forming a resin include formaldehyde, acrolein, glyoxal, furfural, crotonaldehyde, aldol and benzylaldehyde. Suitable phenols that may be reacted with one of the aforementioned aldehydes include phenol, cresol, catechol, phloroglucinol, saligenin, dibeta naphthol, xylenol, xylorcinol, hydroquinone, orcinol, pyrogallol, beta-naphthol, aminophenol, guaiacol, as well as urea and melamine.

When making the phenolic resin, it is desirable to have an excess of phenol present during the reaction with the aldehyde. This results in the production of a resin which will react with the polyisocyanate to form a temporary blocking of the polyisocyanate's reactivity with water at temperatures at least below 212° F. and also insure the production of a resin that is chemically reactive as an adhesive component in bonding a cord to rubber and particularly in combination with an R/F/L adhesive, i.e., a resorcinol, formaldehyde, rubber latex mixture, when the blocked polyisocyanate is heated to regenerate the polyisocyanate and the phenolic resin.

A particularly desirable aldehyde type of blocking agent useful in the present invention is one made by reacting resorcinol with formaldehyde in ratios of resorcinol to formaldehyde ranging from 1.0/0.25 to 1.0/1.0. In making this particular resorcinol/formaldehyde resinous type of blocking agent, it is desired that a deficient amount of formaldehyde be used, particularly less than 1, and preferably between 0.5 and 0.75. The reaction of the resorcinol and the formaldehyde may be carried out in either a neutral medium or a medium which is made basic with, for example, sodium hydroxide or made acidic with, for example, oxalic acid. It is preferred to use a resorcinol/formaldehyde resin wherein the ratio is 1.0 of resorcinol to 0.7 of formaldehyde reacted in a neutral medium.

The following example is typical of a method for making an aldehyde-type resinous blocking agent for use in forming a blocked isocyanate wherein all parts are by weight unless otherwise indicated.

EXAMPLE 1

*Formaldehyde blocking agent*

To 110 parts of resorcinol, 25 parts by volume of formalin (37% formaldehyde in methanol and water), and 20 parts by volume of water was reacted together in a reaction vessel equipped with both heating and cooling coils, a reflux condenser and a suitable agitator. The mixture was heated to a reflux temperature (100° C.) and allowed to remain at this temperature for 15 minutes. At the end of this time, an additional 30 parts by volume of formalin was added to the reaction mixture at a continuous rate for a period of 10 minutes. At the end of this time, the mixture was continued to be refluxed for an additional 30 minutes. At the end of this time, a resin was formed in the reaction vessel and was allowed to cool at room temperature. A thick syrupy resin (for convenience referred to as Resin A) containing 60% solids, a viscosity of 750 cps. and a pH of 7 was obtained.

The following example is directed to the manufacture of a blocked polyisocyanate useful in this invention:

EXAMPLE 2

*Polymethylene polyphenylisocyanate blocked with resorcinol/formaldehyde resin*

20 parts of Resin A, produced in accordance with Example 1, is reacted with 6 parts of polymethylene polyphenylisocyanate (PAPI) in a suitable reaction vessel of the type described in Example 1 and allowed to react for 48 hours at 72° F. At the end of this time, the resulting reaction mixture is treated with 0.1 part of sodium hydroxide in 100 parts of water. The resulting neutralized blocked polyisocyanate will be referred to for convenience as Resin B. When allowed to age for 8 hours, a clear, supernatant layer of soluble blocked polyisocyanate appears, which may be used separate from the precipitate of the less soluble blocked polyisocyanate.

EXAMPLE 3

*Resin-blocked triphenyl methane triisocyanate*

To 3 parts of triphenyl methane triisocyanate was added 20 parts of Resin A, after which the mixture was diluted with 100 parts of water. The reaction product needs no aging. Therefore, it is available immediately as an adhesive component in making an adhesive of the type described in Example 4. The dilution with water may also be made by adding the water to the resin before adding the polyisocyanate thereto.

EXAMPLE 4

*Resorcinol/formaldehyde/rubber latex adhesive*

A conventional type cord adhesive containing 20% solids is made in accordance with the following formula.

R/F/L ADHESIVE

| Ingredients: | Parts |
|---|---|
| Resorcinol | 2.03 |
| Formaldehyde (37%) | 2.62 |
| Sodium Hydroxide (10%) | 2.00 |
| Terpolymer rubber latex of styrene/butadiene-1,3/vinylpyridine, 15/70/15 (41%) | 14.20 |
| Copolymer rubber latex of styrene/butadiene-1,3 (39%) | 27.40 |
| Water | 51.75 |

To 75 parts of the resorcinol/formaldehyde/rubber latex adhesive composition described above is added 25 parts of Resin B and allowed to age for 4 hours at 72° F.

A reinforcing element comprising a polyester cord 1100/2 (Dacron) was treated with the adhesive composition described here by passing the cord through the adhesive at such a rate as to deposit on the surface of the cord between about 5 to about 10% adhesive solids. This may be achieved by passing the cord through the adhesive composition at the rate of between about 5 feet to about 10 feet per minute and then drying the adhesive on the cord at a temperature of 425° F. for 2½ minutes. The treated cord was then imbedded in a rubber stock compounded as follows.

RUBBER STOCK

| Ingredients: | Parts |
|---|---|
| Natural rubber | 100 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

Adhesion between the cord and rubber was measured on a ¼″ U sample at 250° F. after a 4 minute cure of the rubber stock at 400° F. and found to develop a pull of 25 pounds.

A heat durability test was made by forming a tube of rubber reinforced with a cord treated with the adhesive of this invention in the manner described above and then tested in accordance with the tube fatigue test described in ASTM D-885-59T, Section 42, and also as described in U.S. Patent 2,412,524 and a value of 200 kc. was obtained which compares with 12 pounds adhesion and 20 kc. obtained without the use of a resin-blocked polyisocyanate of the type used in this invention.

An 840/2 nylon cord was substituted for the polyester cord used above and treated in the same manner, but dried at 260° F. for 3 minutes, followed by drying at 410° F. for 80 seconds and found to have developed a hot U adhesion of 34 pounds and a heat durability of 600 kc. in comparison with a 28 pound pull and a 440 kc. for the same cord when treated with the above-noted R/F/L adhesive without the presence of the Resin B.

EXAMPLE 5

*Blocked PAPI as primer coat for cord*

A solution of Resin B was used as a primer coat for polyester cord by passing the cord of Example 4 through a dip tank containing an 11% solids dispersion of Resin B and then passing the dipped cord directly into a second dip tank containing the 20% solids conventional R/F/L adhesive composition of the type shown in Example 4, The double dipped cord is then dried for 3 minutes at 400° F. The treated cord was then imbedded in conventional rubber stock of the type shown in Example 4 and found to have developed a hot adhesion of 24 pounds and a heat durability of 90 kc.

EXAMPLE 6

*Resin B with deficient aldehyde R/F/L adhesive*

A resorcinol/formaldehyde/rubber latex adhesive composition was made in accordance with the following formula.

Ingredients: Parts
Resorcinol _____ 98
Formaldehyde (37%) _____ 53
Terpolymer rubber latex of styrene/butadiene-
  1,3/vinylpyridine, 15/70/15 (41%) _____ 1152
Water _____ 543

The R/F/L adhesive composition was prepared by adding 98 parts of the resorcinol to 196 parts of water followed by the addition of 53 parts of formaldehyde. The resulting mixture was aged for 1 hour and then 1152 parts of terpolymer rubber latex was added. The resulting mixture was aged for a period of 72 hours. After aging, the balance of the water was added. To 65 parts of this R/F/L adhesive composition was added 35 parts of Resin B. The resulting adhesive blend was aged for 24 hours.

A reinforcing element comprising a polyester cord 1100/2 (Dacron) was passed through a dip tank containing the aged adhesive composition described above and then dried for 2½ minutes at 440° F. The treated cord was then imbedded in the rubber stock of Example 4 and found to have developed a hot U adhesion of 26 pounds and a heat durability of 520 kc.

The phenol/aldehyde/synthetic rubber latex adhesive composition shown in Example 6 is made with a deficient amount of formaldehyde, in contrast to an excess amount of formaldehyde shown for the R/F/L adhesive of Example 4, and found to produce improved heat durability values for cord bonded to rubber with an adhesive of the type disclosed in Example 6. Thus, it has been discovered that an improved heat durability bond is obtained between a cord and rubber when using an R/F/L type of adhesive wherein the ratio of formaldehyde to phenol is less than 1 and preferably in the range of from about 0.5 to 1 in combination with an aldehyde resin-blocked polyisocyanate.

EXAMPLE 7

*TMDI-blocked polyisocyanate-R/F/L adhesive*

The conditions of Example 4 were repeated with the exception that the resin of Example 3 was substituted for Resin B and found to develop a pull of 32.5 pounds.

The following table shows the ¼″ U adhesion developed at 250° F. using the same cure of the stock as described in Example 4 when using different polyisocyanates blocked with R/F resins made using different ratios of resorcinol and formaldehyde, as indicated, using the procedure for making the resin disclosed in Example 1.

EXAMPLE 14

A conventional tubeless pneumatic tire comprising an open-bellied, hollow annular body terminating in spaced apart bead portions and as described in U.S. Patent 2,987,094 was made with plies of polyester cord bonded to rubber with the R/F/L-blocked polyisocyanate adhesive of Example 4 as a first dip, dried on the cord at 400° F. for 2½ minutes and then the dried cord was treated with a second dip comprising the R/F/L adhesive described in Example 4 without the blocked polyisocyanate being present in the second dip and dried at 430° F. for 1 minute.

The tire was tested by running it against a cleated wheel while inflated to 24 pounds pressure at 60 miles an hour for 5,000 miles before ply separation appeared. This compares with only 2,500 miles for the same test on a similar tire but using a rubber cement containing PAPI dissolved in toluene as the sole single adhesive treatment of the cord prior to bonding to rubber as described above.

The exceptional adhesion developed between rubber and a polyester cord using the blocked polyisocyanates indicated in the examples above may be more fully apprecited as being an unexpected phenomenon in adhesion when it is observed that the same Dacron cord dipped only in the conventional R/F/L adhesive used in the second dips described in Example 4 above developed only an adhesion of 12 pounds and a durability of only 25,000 cycles.

While certain representative embodiments and details have been shown for the purpose of illustrating the invention, it will be apparent to those skilled in this art that various changes and modifications may be made therein without departing from the spirit or scope of the invention.

We claim:
1. An aqueous adhesive composition comprising a substantially water-soluble addition product of a polyisocyanate and a water-soluble and thermoplastic resin wherein said resin is present in more than an equal amount by weight of said polyisocyanate, the resin resulting from the reaction of formaldehyde with a monomeric organic compound reactive therewith and selected from the group consisting of a phenol, urea and melamine to form said resin having an active hydrogen reactive with polyisocyanate, the mole ratio of said monomeric organic compound to said formaldehyde in said reaction being 1/.25 to 1/1, and a reaction product of a phenol, formaldehyde and a rubber latex.

2. The adhesive composition of claim 1 wherein the first mentioned phenol is resorcinol.

3. The adhesive composition of claim 2 wherein the first mentioned formaldehyde is present in an amount of from 0.25 to less than 1 mol per mol of resorcinol.

4. The adhesive composition of claim 3 wherein the polyisocyanate contains as the principal ingredient polymethylene polyphenyl isocyanate.

5. The adhesive composition of claim 1 wherein the addition product comprises a mixture of water-soluble and water-insoluble components.

TABLE 1

| Examples | 8 | 9 | 10 | 11 | 12 | 13 |
|---|---|---|---|---|---|---|
| Polyisocyanate | TMTI [1] | TODI [2] | TDI [3] | DADI [4] | CB75 [5] | PAPI [6] |
| Resorcinol/CH$_2$O Ratio: | | | | | | |
| 1/.25 Series A | 19.9 | 16.7 | ([7]) | 15.6 | 16.0 | 18.9 |
| 1/.50 series B | 21.9 | 20.5 | 12.2 | 15.2 | 15.4 | 21.0 |
| 1/.70 series C | 20.5 | 21.5 | ([7]) | 24.8 | 19.0 | 18.1 |
| Percent Solids | 18 | 13 | 5 | 13 | 7 | 11 |

[1] Triphenyl methane triisocyanate.
[2] Bitolylene diisocyanate.
[3] 2,4-tolylene diisocyanate.
[4] Dianisidine diisocyanate.
[5] Mondur CB-75 (reaction product of 1,2,3-trimethylol propane and 2,4-TDI).
[6] Polymethylene polyphenylisocyanate.
[7] NS.

6. An aqueous adhesive composition comprising a substantially water-soluble addition product of a polyisocyanate and a water-soluble and thermoplastic resin, the resin resulting from the reaction of formaldehyde with a monomeric organic compound reactive therewith and selected from the group consisting of a phenol, urea and melamine to form said resin having an active hydrogen reactive with polyisocyanate, and a reaction product of a phenol, formaldehyde and a rubber latex.

7. An aqueous adhesive composition comprising an addition product of a polyisocyanate and a water-soluble and thermoplastic resin, the resin resulting from the reaction of formaldehyde with a monomeric organic compound reactive therewith and selected from the group consisting of a phenol, urea and melamine to form said resin having an active hydrogen reactive with polyisocyanate, and a reaction product of a phenol, formaldehyde and a rubber latex.

8. An aqueous adhesive composition comprising water, a substantially water-soluble addition product of a polyisocyanate and a water-soluble and thermoplastic resin wherein said resin is present in more than equal amounts of said polyisocyanate, the resin resulting from the reaction of formaldehyde with a monomeric organic compound reactive therewith and selected from the group consisting of a phenol, urea and melamine to form said resin having an active hydrogen reactive with the polyisocyanate, the mole ratio of said monomeric organic compound to said formaldehyde in said reaction being 1/.25 to 1/1.

References Cited by the Examiner
UNITED STATES PATENTS

| | | | |
|---|---|---|---|
| 2,314,998 | 3/1943 | Lessig et al. | 156—335 |
| 2,349,756 | 5/1944 | Pratt. | |
| 2,801,990 | 8/1957 | Seeger et al. | 260—77.5 |
| 2,993,825 | 7/1961 | Gage | 260—77.5 |

SAMUEL H. BLECH, *Primary Examiner.*

LEON J. BERCOVITZ, MURRAY TILLMAN,
*Examiners.*

D. W. ERICKSON, J. C. BLEUTGE,
*Assistant Examiners.*